(12) United States Patent
Sakurada et al.

(10) Patent No.: US 11,987,175 B2
(45) Date of Patent: May 21, 2024

(54) CONTROL DEVICE, SYSTEM, VEHICLE, AND CONTROL METHOD

(71) Applicant: TOYOTA JIDOSHA KABUSHIKI KAISHA, Toyota (JP)

(72) Inventors: Shin Sakurada, Toyota (JP); Satoru Sakuma, Nagakute (JP); Genshi Kuno, Kasugai (JP); Shota Minami, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 17/701,334

(22) Filed: Mar. 22, 2022

(65) Prior Publication Data

US 2022/0379805 A1    Dec. 1, 2022

(30) Foreign Application Priority Data

May 25, 2021  (JP) .................. 2021-087924

(51) Int. Cl.
*B60Q 1/50* (2006.01)
*B60Q 1/04* (2006.01)

(52) U.S. Cl.
CPC . *B60Q 1/50* (2013.01); *B60Q 1/04* (2013.01)

(58) Field of Classification Search
CPC . B60Q 1/50; B60Q 1/04; B60Q 5/005; B60Q 1/52; B60L 2250/00; B60L 2250/10; B60L 53/63; G05B 19/0423; G05B 2219/25257; H04W 4/40
See application file for complete search history.

(56) References Cited

U.S. PATENT DOCUMENTS

| 2008/0040479 | A1* | 2/2008 | Bridge | B60L 53/63 709/224 |
| 2012/0025842 | A1* | 2/2012 | Gibbs | G01R 31/69 324/538 |
| 2013/0015814 | A1 | 1/2013 | Kelty et al. | |
| 2016/0075275 | A1* | 3/2016 | Salter | B60Q 3/74 315/77 |
| 2020/0238849 | A1* | 7/2020 | Kusada | B60W 50/14 |
| 2022/0159814 | A1* | 5/2022 | Dudar | H05B 47/19 |

FOREIGN PATENT DOCUMENTS

| JP | 2006-158084 A | 6/2006 |
| JP | 2013-021914 A | 1/2013 |
| JP | 2015-022352 A | 2/2015 |
| JP | 2020-117178 A | 8/2020 |

* cited by examiner

*Primary Examiner* — Omeed Alizada
(74) *Attorney, Agent, or Firm* — Oliff PLC (57) ABSTRACT

A control device for controlling a vehicle provided with a power supply function for a user includes a control unit that causes a light of the vehicle to blink under a certain condition when a power outage is detected.

18 Claims, 4 Drawing Sheets

CONTROL DEVICE, SYSTEM, VEHICLE, AND CONTROL METHOD

CROSS-REFERENCE TO RELATED APPLICATION

This application claims priority to Japanese Patent Application No. 2021-087924 filed on May 25, 2021, incorporated herein by reference in its entirety.

BACKGROUND

1. Technical Field

The present disclosure relates to a control device, a system, a vehicle, and a control method.

2. Description of Related Art

Japanese Unexamined Patent Application Publication No. 2020-117178 (JP 2020-117178 A) discloses a vehicle that supplies electric power to an external device when a disaster occurs.

SUMMARY

Even when a power outage occurs due to a disaster or the like and the power supply function of the vehicle is useful, if the user does not know or forgets that the vehicle has the power supply function, the power supply function of the vehicle cannot be effectively utilized.

An object of the present disclosure is to promote effective utilization of the power supply function of the vehicle.

A control device according to the present disclosure is a control device for controlling a vehicle provided with a power supply function for a user. The control device includes a control unit that causes a light of the vehicle to blink under a certain condition when a power outage is detected.

A control method according to the present disclosure is a control method for controlling a vehicle provided with a power supply function for a user. The control method includes causing a light of the vehicle to blink by a control unit under a certain condition when a power outage is detected.

According to the present disclosure, it is possible to promote effective utilization of the power supply function of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described below with reference to the drawings.

In each drawing, the same or corresponding portions are denoted by the same reference signs. In the description of each embodiment, description of the same or corresponding components will be appropriately omitted or simplified.

An embodiment of the present disclosure will be described.

Figure 1:
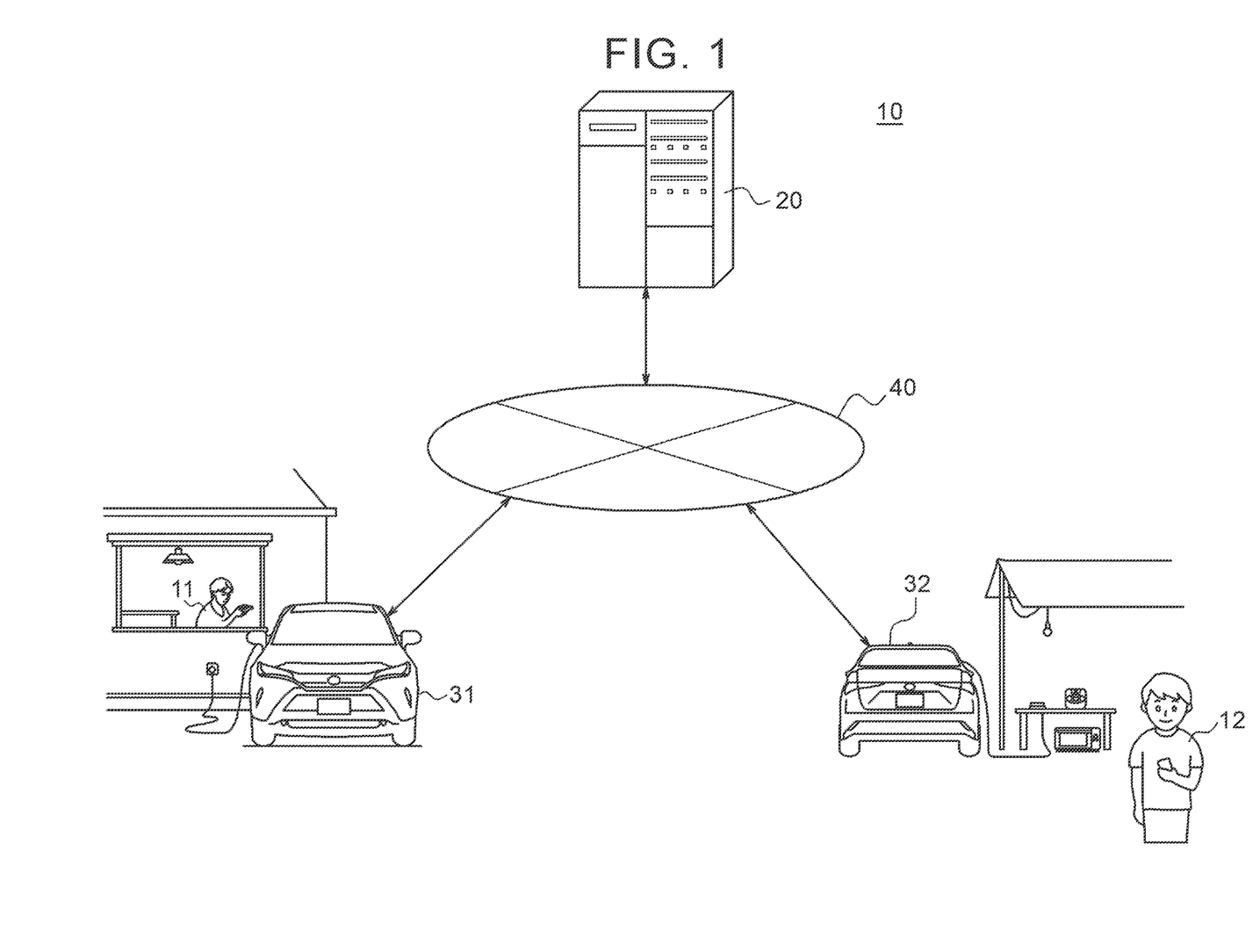
FIG. 1 is a diagram showing a configuration of a system according to an embodiment of the present disclosure.

The configuration of a system 10 according to the present embodiment will be described with reference to FIG. 1.

The system 10 according to the present embodiment includes at least one control device 20, a first vehicle 31 that is at least one vehicle having a power supply function for a user, and a second vehicle 32 that is at least one other vehicle. The control device 20 can communicate with the first vehicle 31 and the second vehicle 32 via a network 40.

The control device 20 is installed in facilities such as a data center. The control device 20 is a computer such as a server belonging to a cloud computing system or other computing systems.

The first vehicle 31 is used by a first user 11. The first user 11 is, for example, the owner of the first vehicle 31. When the first vehicle 31 is not in use, the first vehicle 31 is parked in the parking space at the home of the first user 11. The first vehicle 31 is an HEV, a PHEV, or a BEV in the present embodiment, but may be an FCEV. The term "HEV" is an abbreviation for "hybrid electric vehicle". The term "PHEV" is an abbreviation for "plug-in electric hybrid vehicle". The term "BEV" is an abbreviation for "battery electric vehicle". The term "FCEV" is an abbreviation for "fuel cell electric vehicle".

The second vehicle 32 is used by a second user 12. The second user 12 is, for example, the owner of the second vehicle 32. When the second vehicle 32 is not in use, the second vehicle 32 is parked in the parking space at the home of the second user 12. The home of the second user 12 is in the neighborhood of the home of the first user 11. In the present embodiment, the second vehicle 32 has a power supply function for a user, like the first vehicle 31. The second vehicle 32 is also an HEV, a PHEV, or a BEV in the present embodiment, but may be an FCEV.

The network 40 includes the Internet, at least one WAN, at least one MAN, or any combination thereof. The term "WAN" is an abbreviation for "wide area network". The term "MAN" is an abbreviation for "metropolitan area network". The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation for "local area network".

The outline of the present embodiment will be described with reference to FIG. 1.

The control device 20 acquires a first image D1a taken by the first vehicle 31. The control device 20 identifies an electric light that is turned off, which is included in the acquired first image D1a. The control device 20 refers to definition data D2 and determines whether a power outage has occurred. The definition data D2 is data that defines whether the identified electric light should be lit during the time zone in which the first image D1a was taken.

According to the present embodiment, when a power outage occurs due to a disaster or the like, the power outage can be detected by using a vehicle having a power supply function even if power outage information cannot be obtained from the center. In other words, the power outage can be detected independently.

The control device 20 controls the first vehicle 31. Specifically, when the control device 20 detects a power outage, the control device 20 causes a light 56 of the first vehicle 31 to blink under a certain condition Cx. When the control device 20 detects a power outage, the control device 20 causes a horn 57 of the first vehicle 31 to ring under a certain condition Cy.

According to the present embodiment, when a power outage occurs due to a disaster or the like, even when the first user 11 does not know or forgets that the first vehicle 31 has a power supply function, the attention of the first user 11 can be directed to the first vehicle 31. As a result, the first user 11 can be informed or reminded that the first vehicle 31 has a power supply function. Therefore, it is possible to promote effective utilization of the power supply function of the vehicle of the first vehicle 31.

Figure 2:
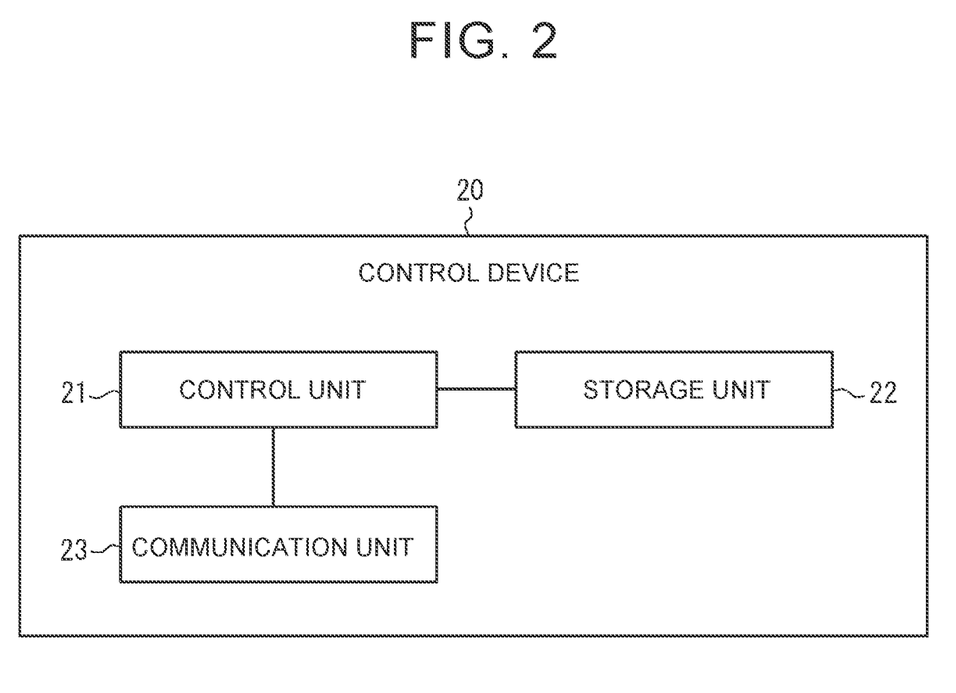
FIG. 2 is a block diagram showing a configuration of a control device according to the embodiment of the present disclosure.

The configuration of the control device 20 according to the present embodiment will be described with reference to FIG. 2.

The control device 20 includes a control unit 21, a storage unit 22, and a communication unit 23.

The control unit 21 includes at least one processor, at least one programmable circuit, at least one dedicated circuit, or any combination thereof. The processor is a general-purpose processor such as a CPU or GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 21 executes processes related to an operation of the control device 20 while controlling each unit of the control device 20.

The storage unit 22 includes at least one semiconductor memory, at least one magnetic memory, at least one optical memory, or any combination thereof. The semiconductor memory is, for example, a RAM or a ROM. The term "RAM" is an abbreviation for "random access memory". The term "ROM" is an abbreviation for "read only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read only memory". The storage unit 22 functions as, for example, a main storage device, an auxiliary storage device, or a cache memory. The storage unit 22 stores data used for the operation of the control device 20 and data acquired through the operation of the control device 20.

The communication unit 23 includes at least one communication interface. The communication interface is, for example, a LAN interface. The communication unit 23 receives the data used for the operation of the control device 20, and transmits the data acquired through the operation of the control device 20.

The function of the control device 20 is realized by executing the program according to the present embodiment with the processor serving as the control unit 21. That is, the function of the control device 20 is realized by software. The program causes the computer to perform the operation of the control device 20 such that the computer functions as the control device 20. That is, the computer functions as the control device 20 by performing the operation of the control device 20 in accordance with the program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. The term "SD" is an abbreviation for "secure digital". The term "DVD" is an abbreviation for "digital versatile disc". The term "CD-ROM" is an abbreviation for "compact disc read only memory". The program may be stored in the storage of the server and transferred from the server to other computers to distribute the program. The program may be provided as a program product.

The computer temporarily stores the program stored in the portable medium or the program transferred from the server in the main storage device, for example. Then, the computer causes the processor to read the program stored in the main storage device, and causes the processor to perform processes according to the read program. The computer may read the program directly from the portable medium and perform processes according to the program. The computer may perform the processes according to the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and is equivalent to a program. For example, data that is not a direct command to a computer but has the property of defining the processing of the computer corresponds to the "information equivalent to a program".

A part or all of the functions of the control device 20 may be realized by a programmable circuit or a dedicated circuit as the control unit 21. That is, a part or all of the functions of the control device 20 may be realized by hardware.

Figure 3:
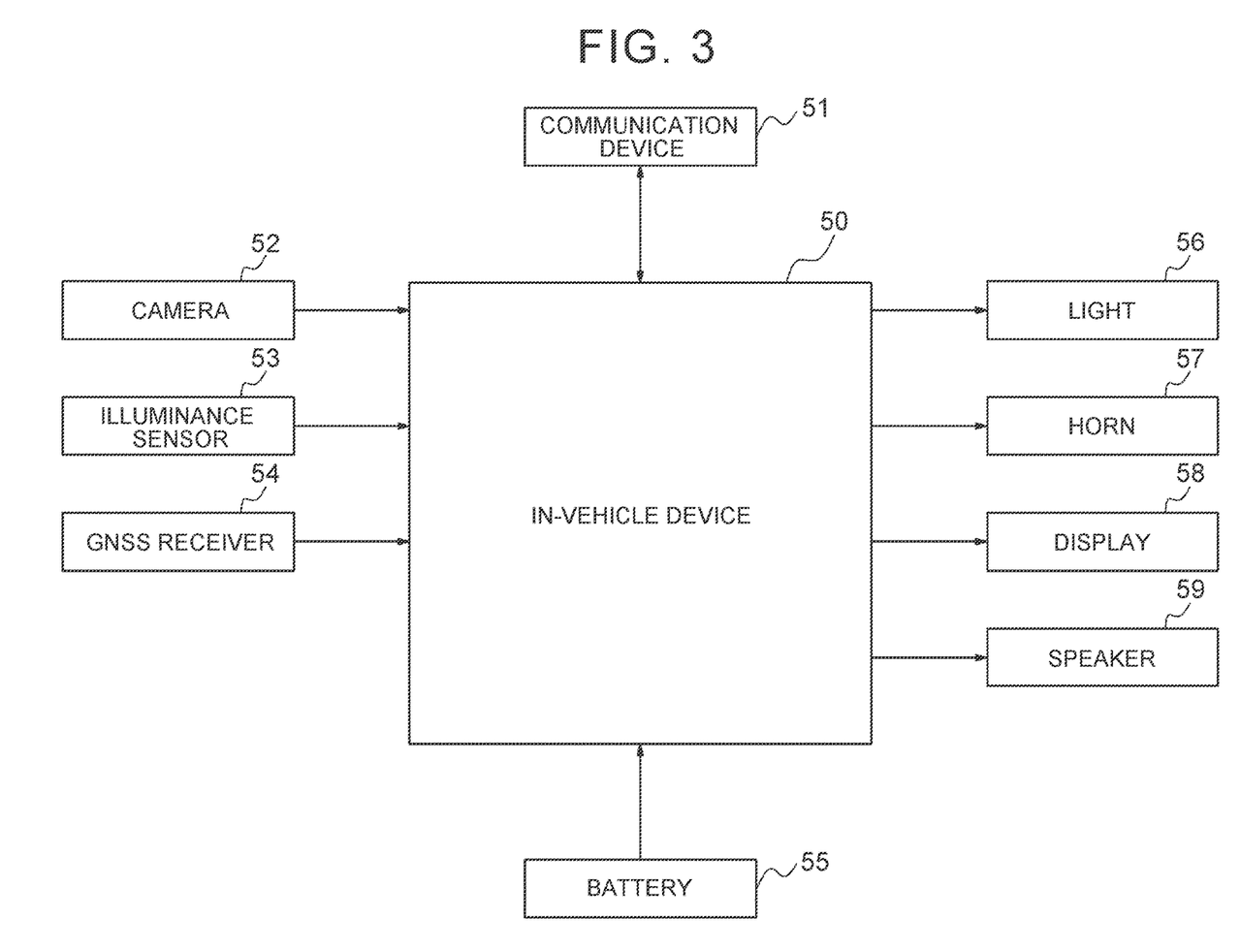
FIG. 3 is a block diagram showing a connection between an in-vehicle device of a vehicle according to the embodiment of the present disclosure and other units.

The configuration of the first vehicle 31 according to the present embodiment will be described with reference to FIG. 3.

The first vehicle 31 includes an in-vehicle device 50. The in-vehicle device 50 is, for example, a microcomputer or an ECU. The term "ECU" is an abbreviation for "electronic control unit".

The in-vehicle device 50 is connected to a communication device 51, a camera 52, an illuminance sensor 53, a GNSS receiver 54, a battery 55, the light 56, the horn 57, a display 58, and a speaker 59 of the first vehicle 31. The term "GNSS" is an abbreviation for "global navigation satellite system". The communication device 51 has a function of transmitting and receiving data using a communication interface such as an interface compatible with mobile communication standards such as LTE, the 4G standard, or the 5G standard, an interface compatible with V2X communication standards such as DSRC or cellular V2X, an interface compatible with short-range wireless communication standards such as Bluetooth (registered trademark), or a wireless LAN interface. The term "LTE" is an abbreviation for "long term evolution". The term "4G" is an abbreviation for "fourth generation". The term "5G" is an abbreviation for "fifth generation". The term "DSRC" is an abbreviation for "dedicated short range communications". The term "V2X" is an abbreviation for "vehicle-to-everything". The camera 52 and the illuminance sensor 53 are the same as those provided in a general REV, PHEV, or BEV. The GNSS receiver 54 has a function of measuring the position of the first vehicle 31 by using GNSS such as GPS, QZSS, BDS, GLONASS, or Galileo. The term "GPS" is an abbreviation for "global positioning system". The term "QZSS" is an abbreviation for "quasi-zenith satellite system". The satellites of the QZSS are referred to as quasi-zenith satellites. The term "BDS" is an abbreviation for "BeiDou navigation satellite system". The term "GLONASS" is an abbreviation for "global navigation satellite system". The battery 55, the light 56, the horn 57, the display 58, and the speaker 59 are the same as those provided in a general REV, PHEV, or BEV. When the first vehicle 31 is an FCEV, the fuel cell is provided instead of the battery 55. The light 56 is a headlight in the present embodiment, but may be a tail light, a brake light, a hazard lamp, or an interior light. The display 58 is, for example, an LCD or an organic EL display. The term "LCD" is an abbreviation for "liquid crystal display". The term "EL" is an abbreviation for "electroluminescence".

Since the configuration of the second vehicle 32 is the same as the configuration of the first vehicle 31, the description thereof will be omitted.

Figure 4:
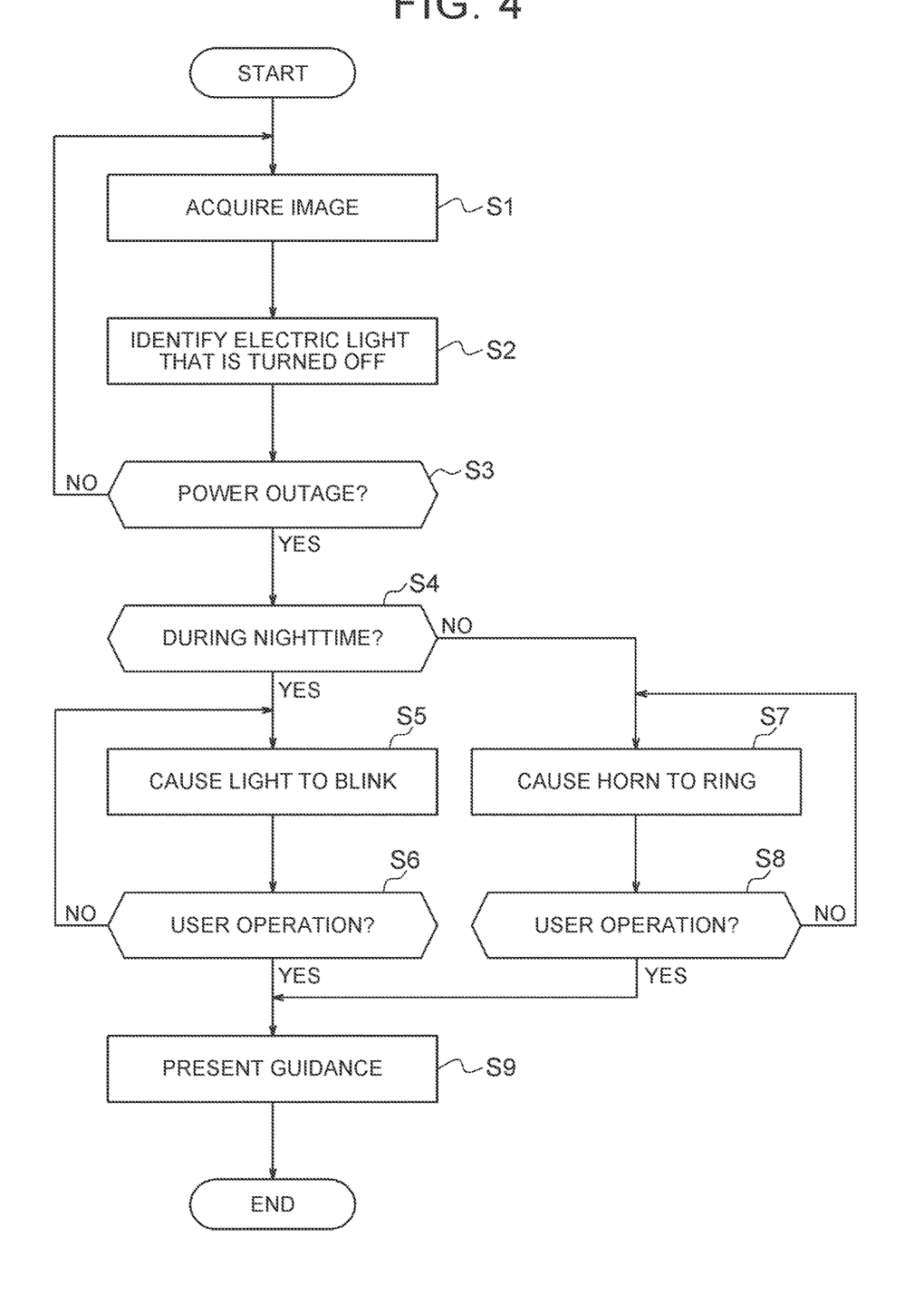
FIG. 4 is a flowchart showing an operation of the system according to the embodiment of the present disclosure.

The configuration of the system 10 according to the present embodiment will be described with reference to FIG. 4. This operation corresponds to the determination method according to the present embodiment. The operation of the control device 20 included in this operation corresponds to the control method according to the present embodiment.

In step S1, the control unit 21 of the control device 20 acquires the first image D1*a* taken by the first vehicle 31. This process may be executed by any procedure, but in the present embodiment, the process is executed by the following procedure.

The camera 52 of the first vehicle 31 takes an image including an electric light such as a traffic signal light or a street light that exists in the vicinity of the first vehicle 31 when the first vehicle 31 is moving, paused, or parked in the parking space at the home of the first user 11. This image may be a still image or a moving image. The GNSS receiver 54 of the first vehicle 31 measures the position of the first vehicle 31 when the image is taken by the camera 52. The in-vehicle device 50 of the first vehicle 31 acquires the image taken by the camera 52 and the positioning result indicating the position measured by the GNSS receiver 54. The in-vehicle device 50 causes the communication device 51 to transmit the acquired image and the positioning result as the first image D1*a* and first position data D3*a*, respectively. The communication device 51 transmits the first image D1*a* and the first position data D3*a* to the control device 20 via mobile communication. The communication unit 23 of the control device 20 receives the first image D1*a* and the first position data D3*a* from the first vehicle 31. The control unit 21 of the control device 20 acquires the first image D1*a* and the first position data D3*a* received by the communication unit 23.

In step S2, the control unit 21 of the control device 20 identifies an electric light that is turned off, which is included in the first image D1*a* acquired in step S1. Specifically, the control unit 21 analyzes the first image D1*a* to identify a traffic signal light or a street light that is turned off as the electric light that is turned off and that is included in the first image D1*a*. As a method of image analysis, a known method can be used. Machine learning such as deep learning may be used.

In step S3, the control unit 21 of the control device 20 refers to the definition data D2 and determines whether a power outage has occurred. The definition data D2 is data that defines whether the electric light identified in step S2 should be lit during the time zone in which the first image D1*a* was taken. In the present embodiment, the definition data D2 is stored in advance in the storage unit 22 of the control device 20. Alternatively, the definition data D2 may be stored in an external storage and referred to via the communication unit 23.

In the present embodiment, the definition data D2 includes data that defines the point where the electric light is installed and the time zone when the electric light should be lit for each electric light installed on the road or the intersection in the same area as the home of the first user 11. For example, suppose that the definition data D2 defines that a certain traffic signal light L1 is installed in the vicinity of the position indicated by the first position data D3*a* acquired in step S1 and that the traffic signal light L1 should be always lit. It is assumed that the traffic signal light L1 is identified, in step S2, as the electric light that is turned off. In this case, the traffic signal light L1 is turned off even though the traffic signal light L1 should be always lit. Therefore, the control unit 21 of the control device 20 determines that a power outage has occurred. Alternatively, suppose that the definition data D2 defines that a certain street light L2 is installed in the vicinity of the position indicated by the first position data D3*a* acquired in step S1 and that the street light L2 should be lit during the nighttime. It is assumed that the street light L2 is identified, in step S2, as the electric light that is turned off. When the time when the first image D1*a* is taken is during the nighttime, such as midnight, the street light L2 should be turned on, but the street light L2 is turned off. Therefore, the control unit 21 determines that a power outage has occurred. When the time when the first image D1*a* is taken is during the daytime, such as noon, the street light L2 may be turned off. Therefore, the control unit 21 determines that a power outage has not occurred.

As the electric light that is turned off and that is included in the first image D1*a*, instead of or in addition to the traffic signal light or the street light that is turned off, a building such as an office building with lights completely turned off may be identified. In such a modification, the definition data D2 includes data that defines the location and business hours for each building existing in the same area as the home of the first user 11. For example, suppose that the definition data D2 defines that a certain office building L3 exists in the vicinity of the position indicated by the first position data D3*a* acquired in step S1 and that the business hours of the office building L3 are from 7:00 AM to 10:00 PM. It is assumed that the office building L3 is identified, in step S2, as the electric light that is turned off. That is, it is assumed that it is recognized that the lights in all the windows of the office building L3 are turned off. When the time when the first image D1*a* is taken is between 7:00 AM and 10:00 PM, the office building L3 should have at least one window with the lights turned on, but the lights in all the windows are turned off. Therefore, the control unit 21 of the control device 20 determines that a power outage has occurred. When the time when the first image D1*a* is taken is earlier than 7:00 AM or later than 10:00 PM, the lights in all the windows of the office building L3 may be turned off. Therefore, the control unit 21 determines that a power outage has not occurred.

It may be determined whether a power outage has occurred by further using an image taken by the second vehicle 32 at a time close to the time when the first image D1*a* was taken. In that case, in step S1, the communication unit 23 of the control device 20 receives, from the second vehicle 32, a second image D1*b* taken by the second vehicle 32 at the same time zone as the first image D1a was taken. The communication unit 23 receives, from the second vehicle 32, second position data D3b indicating the position of the second vehicle 32 together with the second image D1b. The control unit 21 of the control device 20 acquires the second image D1b and the second position data D3b received by the communication unit 23. In step S2, the control unit 21 analyzes the second image D1b acquired in step S1 to identify an electric light such as a traffic signal light or a street light included in the second image D1b. In step S3, the control unit 21 refers to the definition data D2 and determines whether a power outage has occurred. The control unit 21 determines that a power outage has occurred when all the electric lights included in the plurality of images received in step S1 that should be lit during the time zone when the images were taken are turned off.

For example, suppose that, in step S2, the street light L2 described above is identified as the electric light that is turned off and that is included in the first image D1a, and the traffic signal light L1 described above is identified as the electric light that is turned off and that is included in the second image D1b. When the time zone in which the first image D1a and the second image D1b are taken is during the nighttime, both the street light L2 and the traffic signal light L1 should be turned on, but the street light L2 and the traffic signal light L1 are turned off. Therefore, the control unit 21 of the control device 20 determines that a power outage has occurred. When the time zone in which the first image D1a and the second image D1b are taken is during the daytime, the street light L2 may be turned off, and the traffic signal light L1 should be turned on, but the traffic signal light L1 is turned off. Therefore, the control unit 21 determines that a power outage has occurred.

When it is determined in step S3 that no power outage has occurred, the process of step S1 is executed again. When it is determined in step S3 that a power outage has occurred, in step S4 and thereafter, the control unit 21 of the control device 20 causes the light 56 of the first vehicle 31 to blink under a certain condition Cx, and causes the horn 57 of the first vehicle 31 to ring under a certain condition Cy. That is, when the control unit 21 detects a power outage, the control unit 21 causes the light 56 of the first vehicle 31 to blink under the condition Cx. When the control unit 21 detects a power outage, the control unit 21 causes the horn 57 of the first vehicle 31 to ring under the condition Cy.

The condition Cx and the condition Cy may be conditions that can be satisfied at the same time, but in the present embodiment, the condition Cx and the condition Cy are contradictory conditions. Specifically, the condition Cx includes that the time when the power outage is detected is during the nighttime, while the condition Cy includes that the time when the power outage is detected is during the daytime.

In step S4, the control unit 21 of the control device 20 determines which of the condition Cx and the condition Cy is satisfied. Specifically, the control unit 21 determines whether the time when it is determined that a power outage has occurred is during the nighttime or during the daytime. In the present embodiment, the nighttime is the time from sunset to sunrise, and the daytime is the time other than the nighttime, but the definitions of the nighttime and the daytime may be changed as appropriate.

The condition Cx may include, as an alternative or additional condition, that the brightness around the first vehicle 31 is less than a threshold. The condition Cy may include, as an alternative or additional condition, that the brightness around the first vehicle 31 is equal to or more than the threshold. In such a modification, the illuminance sensor 53 of the first vehicle 31 measures the brightness around the first vehicle 31. The in-vehicle device 50 of the first vehicle 31 acquires a measurement result indicating the brightness measured by the illuminance sensor 53. The in-vehicle device 50 causes the communication device 51 to transmit the acquired measurement result as brightness data D4. The communication device 51 transmits the brightness data D4 to the control device 20 via mobile communication. The communication unit 23 of the control device 20 receives the brightness data D4 from the first vehicle 31. The control unit 21 of the control device 20 acquires the brightness data D4 received by the communication unit 23. The control unit 21 compares the brightness indicated by the acquired brightness data D4 with the threshold. That is, the control unit 21 determines which of the condition Cx and the condition Cy is satisfied based on the brightness around the first vehicle 31 instead of or in addition to the time.

The condition Cx may include, as an alternative or additional condition, that the first user 11 is at home. In such a modification, the communication unit 23 of the control device 20 receives data indicating whether the first user 11 is at home from a sensor installed at the home of the first user 11. Alternatively, the communication unit 23 receives data indicating the position of the first user 11 from a mobile device such as a mobile phone, a smartphone, or a tablet of the first user 11. The control unit 21 of the control device 20 refers to the data received by the communication unit 23 and determines whether the first user 11 is at home. That is, the control unit 21 determines whether the condition Cx is satisfied based on the position of the first user 11 instead of or in addition to the time.

The condition Cy may also include, as an alternative or additional condition, that the first user 11 is at home. That is, the control unit 21 of the control device 20 may determine whether the condition Cy is satisfied based on the position of the first user 11 instead of or in addition to the time.

The condition Cx may include, as an alternative or additional condition, that the first vehicle 31 is in the field of view of the first user 11. In such a modification, the communication unit 23 of the control device 20 receives data indicating whether the first user 11 is at home, and if the first user 11 is at home, which room the first user 11 is in from a sensor installed at the home of the first user 11. The control unit 21 of the control device 20 refers to the data received by the communication unit 23 and determines whether the first user 11 is at home, and if the first user 11 is at home, which room the first user 11 is in. The control unit 21 refers to the first position data D3a acquired in step S1 and further determines whether the first vehicle 31 is parked in the parking space at the home of the first user 11. When the control unit 21 determines that the first user 11 is at home and the first vehicle 31 is parked in the parking space at the home of the first user 11, the control unit 21 refers to the data indicating the layout of the home of the first user 11 and further determines whether the first vehicle 31 can be seen from the room where the first user 11 is in. That is, the control unit 21 specifies the position of the first user 11 and determines whether the first vehicle 31 is in the field of view of the first user 11 according to the specified position. As a further modification, the control unit 21 may specify the orientation of the face of the first user 11 and determine whether the first vehicle 31 is in the field of view of the first user 11 according to the specified orientation. The data indicating the orientation of the face of the first user 11 can be acquired from, for example, a sensor installed at the home of the first user 11.

When it is determined in step S4 that the condition Cx is satisfied, the process of step S5 is executed. When it is determined in step S4 that the condition Cy is satisfied, the process of step S7 is executed.

In step S5, the control unit 21 of the control device 20 causes the communication unit 23 to transmit instruction data D5x. The instruction data D5x is data instructing the light 56 of the first vehicle 31 to blink. The communication unit 23 transmits the instruction data D5x to the first vehicle 31. The communication device 51 of the first vehicle 31 receives the instruction data D5x from the control device 20 via mobile communication. The in-vehicle device 50 of the first vehicle 31 causes the light 56 to blink according to the instruction data D5x received by the communication device 51.

In step S6, the control unit 21 of the control device 20 causes the light 56 to keep blinking until the first user 11 performs an operation of stopping the blinking of the light 56. When the control unit 21 causes the light 56 to stop blinking, in step S9, the control unit 21 presents the first user 11 with guidance regarding the use of the power supply function of the first vehicle 31. The processes in step S6 and step S9 may be executed by any procedure, but in the present embodiment, the processes are executed by the following procedure.

The in-vehicle device 50 of the first vehicle 31 displays a message indicating a power outage situation and a "stop blinking" button on the display 58. When the first user 11 presses the "stop blinking" button via a touch screen provided integrally with the display 58, the in-vehicle device 50 causes the communication device 51 to transmit report data D6x. The report data D6x is data for reporting that an operation for stopping the blinking of the light 56 has been performed. The communication device 51 transmits the report data D6x to the control device 20 via mobile communication. The communication unit 23 of the control device 20 receives the report data D6x from the first vehicle 31. The control unit 21 of the control device 20 causes the communication unit 23 to transmit instruction data D7x in response to the report data D6x received by the communication unit 23. The instruction data D7x is data instructing to stop the blinking of the light 56 of the first vehicle 31 and to present the first user 11 with guidance regarding the use of the power supply function of the first vehicle 31. The communication unit 23 transmits the instruction data D7x to the first vehicle 31. The communication device 51 of the first vehicle 31 receives the instruction data D7x from the control device 20 via mobile communication. The in-vehicle device 50 of the first vehicle 31 stops the blinking of the light 56 and presents the first user 11 with guidance regarding the use of the power supply function according to the instruction data D7x received by the communication device 51. Any method may be used as the method of presenting the guidance, but in the present embodiment, the method of displaying the guidance on the display 58, the method of outputting the guidance by voice from the speaker 59 of the first vehicle 31, or a combination of the above is used.

In the present embodiment, the guidance regarding the use of the power supply function of the first vehicle 31 includes an explanation on how to use the power supply function, such as where to insert the power plug of the external device. The guidance may include a notification of the amount of electric power that can be supplied by the power supply function. The amount of electric power that can be supplied may be calculated from the remaining amount of the battery 55 of the first vehicle 31 by the in-vehicle device 50 of the first vehicle 31. The guidance may include a notification of devices that can be powered with the power supply function, such as a rice cooker, a vacuum cleaner, or a smartphone. The device that can be powered may be specified by the in-vehicle device 50 according to the remaining amount of the battery 55.

In the case where the first user 11 discovers that the light 56 of the first vehicle 31 is unintentionally blinking when he/she is not in the first vehicle 31 such as when he/she is at home, it is conceivable that the first user 11 approaches the first vehicle 31 to turn off the light 56. Therefore, it is possible to create an opportunity to notify the first user 11 of the power supply function of the first vehicle 31 without making a sound. It is annoying to the surrounding residents if the first user 11 is notified by making a sound during the nighttime, but such a situation can be avoided in the present embodiment.

In the case where the light 56 of the first vehicle 31 unintentionally starts blinking not only when the first user 11 is not in the first vehicle 31 but also when he/she is in the first vehicle 31 such as when he/she is driving, it is conceivable that the first user 11 performs an operation to stop the blinking of the light 56. Therefore, by presenting the guidance when this operation is performed, the power supply function of the first vehicle 31 can be reliably notified to the first user 11.

In step S7, the control unit 21 of the control device 20 causes the communication unit 23 to transmit instruction data D5y. The instruction data D5y is data instructing the horn 57 of the first vehicle 31 to ring. The communication unit 23 transmits the instruction data D5y to the first vehicle 31. The communication device 51 of the first vehicle 31 receives the instruction data D5y from the control device 20 via mobile communication. The in-vehicle device 50 of the first vehicle 31 causes the horn 57 to ring according to the instruction data D5y received by the communication device 51.

In step S8, the control unit 21 of the control device 20 causes the horn 57 to keep ringing until the first user 11 performs an operation of stopping the ringing of the horn 57. When the control unit 21 causes the horn 57 to stop ringing, in step S9, the control unit 21 presents the first user 11 with guidance regarding the use of the power supply function of the first vehicle 31. The processes in step S8 and step S9 may be executed by any procedure, but in the present embodiment, the processes are executed by the following procedure.

The in-vehicle device 50 of the first vehicle 31 displays a message indicating a power outage situation and a "stop ringing" button on the display 58. When the first user 11 presses the "stop ringing" button via the touch screen provided integrally with the display 58, the in-vehicle device 50 causes the communication device 51 to transmit report data D6y. The report data D6y is data for reporting that an operation for stopping the ringing of the horn 57 has been performed. The communication device 51 transmits the report data D6y to the control device 20 via mobile communication. The communication unit 23 of the control device 20 receives the report data D6y from the first vehicle 31. The control unit 21 of the control device 20 causes the communication unit 23 to transmit instruction data D7y in response to the report data D6y received by the communication unit 23. The instruction data D7y is data instructing to stop the ringing of the horn 57 of the first vehicle 31 and to present the first user 11 with guidance regarding the use of the power supply function of the first vehicle 31. The communication unit 23 transmits the instruction data D7y to the first vehicle 31. The communication device 51 of the first vehicle 31 receives the instruction data D7y from the control device 20 via mobile communication. The in-vehicle device 50 of the first vehicle 31 stops the ringing of the horn 57 and presents the first user 11 with guidance regarding the use of the power supply function according to the instruction data D7y received by the communication device 51. The method of presenting the guidance and the content of the guidance are as described above.

In the case where the first user 11 discovers that the horn 57 of the first vehicle 31 is unintentionally ringing when he/she is not in the first vehicle 31 such as when he/she is at home, it is conceivable that the first user 11 approaches the first vehicle 31 to stop the ringing of the horn 57. Therefore, it is possible to create an opportunity to notify the first user 11 of the power supply function of the first vehicle 31. In the daytime, the horn 57 is effective because it is difficult for the first user 11 to notice even if the light 56 blinks.

In the case where the horn 57 of the first vehicle 31 unintentionally starts ringing not only when the first user 11 is not in the first vehicle 31 but also when he/she is in the first vehicle 31 such as when he/she is driving, it is conceivable that the first user 11 performs an operation to stop the ringing of the horn 57. Therefore, by presenting the guidance when this operation is performed, the power supply function of the first vehicle 31 can be reliably notified to the first user 11.

As described above, in the present embodiment, the control unit 21 of the control device 20 recognizes an electric light such as a traffic light or a nightlight from the image taken by the camera 52 of the first vehicle 31. The control unit 21 determines that a power outage has occurred when the recognized electric light is turned off during the time zone when the electric light is normally lit. Then, the control unit 21 causes the light 56 of the first vehicle 31 to blink or causes the horn 57 of the first vehicle 31 to ring to call the first user 11 to the first vehicle 31 and direct the attention of the first user 11 to the first vehicle 31. When the operation to stop the blinking of the light 56 or the ringing of the horn 57 is performed, the control unit 21 presents the first user 11 with guidance regarding the use of the power supply function.

According to the present embodiment, when a power outage occurs, the power outage can be detected by using the first vehicle 31 even if the power outage information cannot be obtained from the center. In other words, the power outage can be detected independently. As a result, the work required for power supply, such as guidance on how to use the power supply function of the first vehicle 31, can be performed by the system 10 alone.

The control unit 21 of the control device 20 may specify an area where a power outage has occurred based on the state of an electric light such as a traffic light at a plurality of locations. The control unit 21 may send a push-notification to a person in the specified area that electric power can be supplied from the first vehicle 31.

When a power outage occurs, the control unit 21 of the control device 20 may cause the light 56 of the first vehicle 31 to blink or cause the horn 57 of the first vehicle 31 to ring to inform the surroundings of the first vehicle 31 that the first vehicle 31 has a power supply function.

In step S6, the control unit 21 of the control device 20 may cause the light 56 to keep blinking until the first user 11 simply gets in the first vehicle 31 instead of until the first user 11 performs an operation of stopping the blinking of the light 56. In such a modification, the in-vehicle device 50 of the first vehicle 31 causes the communication device 51 to transmit report data D8x when the first user 11 is detected by a camera or a weight sensor installed inside the first vehicle 31, or when an event implying that the first user 11 has gotten in the first vehicle 31 occurs, such as when the door of the first vehicle 31 is once opened and then closed. The report data D8x is data for reporting that the first user 11 has gotten in the first vehicle 31. The communication device 51 transmits the report data D8x to the control device 20 via mobile communication. The communication unit 23 of the control device 20 receives the report data D8x from the first vehicle 31. The control unit 21 of the control device 20 causes the communication unit 23 to transmit the instruction data D7x in response to the report data D8x received by the communication unit 23.

In step S6, the control unit 21 of the control device 20 may cause the horn 57 to keep ringing until the first user 11 simply gets in the first vehicle 31 instead of until the first user 11 performs an operation of stopping the ringing of the horn 57. In such a modification, the in-vehicle device 50 of the first vehicle 31 causes the communication device 51 to transmit report data D8y when the first user 11 is detected by a camera or a weight sensor installed inside the first vehicle 31, or when an event implying that the first user 11 has gotten in the first vehicle 31 occurs, such as when the door of the first vehicle 31 is once opened and then closed. The report data D8y is data for reporting that the first user 11 has gotten in the first vehicle 31. The communication device 51 transmits the report data D8y to the control device 20 via mobile communication. The communication unit 23 of the control device 20 receives the report data D8y from the first vehicle 31. The control unit 21 of the control device 20 causes the communication unit 23 to transmit the instruction data D7y in response to the report data D8y received by the communication unit 23.

When the control unit 21 of the control device 20 causes the horn of a neighboring vehicle such as the second vehicle 32, which has the same function as the first vehicle 31, to ring like the horn 57 of the first vehicle 31, the ringing pattern such as the rhythm or the ringing timing may be different depending on the horn. In that case, in step S7, the control unit 21 of the control device 20 sets the ringing pattern of the horn 57 of the first vehicle 31 to a first pattern and the ringing pattern of the horn of the second vehicle 32 to a second pattern. The first pattern and the second pattern are different from each other. The control unit 21 causes the communication unit 23 to transmit first instruction data D5ya as the instruction data D5y. The first instruction data D5ya is data instructing the horn 57 of the first vehicle 31 to ring in the first pattern. The control unit 21 further causes the communication unit 23 to transmit second instruction data D5yb. The second instruction data D5yb is data instructing the horn of the second vehicle 32 to ring in the second pattern. The communication unit 23 transmits the second instruction data D5yb to the second vehicle 32. The communication device of the second vehicle 32 receives the second instruction data D5yb from the control device 20 via mobile communication. The in-vehicle device of the second vehicle 32 causes the horn of the second vehicle 32 to ring in the second pattern according to the second instruction data D5yb received by the communication device. According to such a modification, the ringing pattern of the horn for each vehicle can be customized. Therefore, it is easy to understand which vehicle's horn is ringing.

When it is determined in step S3 that a power outage has occurred, the control unit 21 of the control device 20 may notify the first user 11 that a power outage has occurred, instead of causing the light 56 of the first vehicle 31 to blink or causing the horn 57 of the first vehicle 31 to ring. That is, when the control unit 21 determines that a power outage has occurred, the control unit 21 may simply notify the first user 11 that a power outage has occurred. In that case, when the control unit 21 detects the approach of the first user 11 to the first vehicle 31, the control unit 21 may present the first user 11 with guidance regarding the use of the power supply function of the first vehicle 31, as in step S9. In such a modification, the in-vehicle device 50 of the first vehicle 31 causes the communication device 51 to transmit report data D6z when the communication device 51 of the first vehicle 31 detects a mobile device such as a mobile phone, a smartphone, or a tablet of the first user 11 via short-range wireless communication such as Bluetooth (registered trademark) or via wireless LAN communication, or when an event implying that the first user 11 has approached the first vehicle 31 occurs, such as when the camera 52 of the first vehicle 31 takes an image of the first user 11. The report data D6z is data for reporting that the first user 11 has approached the first vehicle 31. The communication device 51 transmits the report data D6z to the control device 20 via mobile communication. The communication unit 23 of the control device 20 receives the report data D6z from the first vehicle 31. The control unit 21 of the control device 20 causes the communication unit 23 to transmit instruction data D7z in response to the report data D6z received by the communication unit 23. The instruction data D7z is data instructing to present the first user 11 with guidance regarding the use of the power supply function of the first vehicle 31. The communication unit 23 transmits the instruction data D7z to the first vehicle 31. The communication device 51 of the first vehicle 31 receives the instruction data D7z from the control device 20 via mobile communication. The in-vehicle device 50 of the first vehicle 31 presents the first user 11 with guidance regarding the use of the power supply function according to the instruction data D7z received by the communication device 51. The method of presenting the guidance and the content of the guidance are as described above, but as a modification of the method of presenting the guidance, a method of displaying the guidance on the mobile device of the first user 11, a method of outputting the guidance by voice from the mobile device of the first user 11, or a combination of the above may be used.

The present disclosure is not limited to the embodiments described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

For example, the control device 20 may be provided in the first vehicle 31. In that case, a part of the operation of the in-vehicle device 50 of the first vehicle 31 may be performed by the control device 20. The control device 20 may directly present the guidance regarding the use of the power supply function of the first vehicle 31 to the first user 11 instead of presenting the guidance to the first user 11 via the in-vehicle device 50. The in-vehicle device 50 may be integrated into the control device 20. In such a modification, the processes in step S1 to step S3 are executed, for example, by the following procedure.

In step S1, the camera 52 of the first vehicle 31 captures an image including an electric light such as a traffic signal light or a street light existing in the vicinity of the first vehicle 31. The GNSS receiver 54 of the first vehicle 31 measures the position of the first vehicle 31 when the image is taken by the camera 52. The control unit 21 of the control device 20 acquires the image taken by the camera 52 and the positioning result indicating the position measured by the GNSS receiver 54 as the first image D1a and the first position data D3a, respectively. The communication unit 23 of the control device 20 receives, from the second vehicle 32 via vehicle-to-vehicle communication, the second image D1b taken by the second vehicle 32 at the same time zone as the first image D1a was taken. The communication unit 23 receives, from the second vehicle 32, the second position data D3b indicating the position of the second vehicle 32 together with the second image D1b. The control unit 21 acquires the second image D1b and the second position data D3b received by the communication unit 23.

In step S2, the control unit 21 of the control device 20 analyzes the first image D1a acquired in step S1 to identify an electric light such as a traffic signal light or a street light that is turned off and that is included in the first image D1a. The control unit 21 analyzes the second image D1b acquired in step S1 to identify an electric light such as a traffic signal light or a street light that is turned off and that is included in the second image D1b.

In step S3, the control unit 21 of the control device 20 refers to the definition data D2 and determines whether a power outage has occurred. The control unit 21 determines that a power outage has occurred when all the electric lights included in the plurality of images including the first image D1a taken in step S1 and the second image D1b received in step S1 that should be lit during the time zone when the images were taken are turned off.

According to this modification, when a power outage occurs, the power outage can be detected by the first vehicle 31 alone even if the power outage information cannot be obtained from the center. As a result, the work required for power supply, such as guidance on how to use the power supply function of the first vehicle 31, can be performed by the first vehicle 31 alone.

In this modification, when the control unit 21 of the control device 20 causes the horn of a neighboring vehicle such as the second vehicle 32, which has the same function as the first vehicle 31, to ring like the horn 57 of the first vehicle 31, the ringing pattern such as the rhythm or the ringing timing may be different depending on the horn. In that case, in step S7, the control unit 21 of the control device 20 sets the ringing pattern of the horn 57 of the first vehicle 31 to the first pattern. The control unit 21 causes the horn 57 of the first vehicle 31 to ring in the first pattern, and causes the communication unit 23 to transmit first setting data D9a. The first setting data D9a is data for setting the ringing pattern of the horn of the second vehicle 32 to the second pattern that is different from the first pattern. The communication unit 23 transmits the first setting data D9a to the second vehicle 32. The communication device of the second vehicle 32 receives the first setting data D9a from the control device 20 via vehicle-to-vehicle communication. The in-vehicle device of the second vehicle 32 refers to the first setting data D9a received by the communication device, and causes the horn of the second vehicle 32 to ring in the second pattern. According to this modification, the ringing patterns of the horns for each vehicle can be adjusted so as not to overlap each other via vehicle-to-vehicle communication.

As a further modification, the ringing pattern of the horn 57 of the first vehicle 31 may be set by the second vehicle 32 instead of by the first vehicle 31. In that case, in step S7, the communication unit 23 of the control device 20 receives second setting data D9b from the second vehicle 32. The second setting data D9b is data for setting the ringing pattern of the horn 57 of the first vehicle 31 to the first pattern that is different from the second pattern, which is the ringing pattern of the horn of the second vehicle 32. The control unit 21 of the control device 20 refers to the second setting data D9b received by the communication unit 23, and causes the horn 57 of the first vehicle 31 to ring in the first pattern. According to this modification, the ringing patterns of the horns for each vehicle can be adjusted so as not to overlap each other via vehicle-to-vehicle communication.

What is claimed is:

1. A control device for controlling a vehicle provided with a power supply function for a user, the control device comprising a control unit that causes a light of the vehicle to blink under a certain condition when a power outage is detected, wherein:
   the condition includes that the vehicle is in a field of view of the user; and
   the control unit specifies a position of the user and determines whether the vehicle is in the field of view of the user according to the specified position.

2. The control device according to claim 1, wherein the condition includes that a time when the power outage is detected is during the nighttime.

3. The control device according to claim 1, wherein the condition includes that a brightness around the vehicle is less than a threshold.

4. The control device according to claim 1, wherein the condition includes that the user is at home.

5. The control device according to claim 1, wherein the control unit specifies an orientation of a face of the user and determines whether the vehicle is in the field of view of the user according to the specified orientation.

6. The control device according to claim 1, wherein the control unit causes the light to keep blinking until the user performs an operation to stop the blinking of the light.

7. The control device according to claim 1, wherein the control unit causes the light to keep blinking until the user gets in the vehicle.

8. The control device according to claim 1, wherein when the control unit causes the blinking of the light to stop, the control unit presents the user with guidance regarding use of the power supply function.

9. The control device according to claim 8, wherein the guidance includes an explanation on how to use the power supply function.

10. The control device according to claim 8, wherein the guidance includes a notification of an amount of electric power that is able to be supplied by the power supply function.

11. The control device according to claim 8, wherein the guidance includes a notification of a device that is able to be powered by the power supply function.

12. The control device according to claim 1, further comprising a communication unit that communicates with the vehicle, wherein the control unit causes the communication unit to transmit instruction data for instructing the light to blink to cause the light to blink.

13. A system comprising:
   the control device according to claim 12; and
   the vehicle.

14. The system according to claim 13, wherein the vehicle causes a headlight to blink as the light.

15. A vehicle comprising the control device according to claim 1.

16. The vehicle according to claim 15, wherein the vehicle causes a headlight to blink as the light.

17. A control method for controlling a vehicle provided with a power supply function for a user, the control method comprising:
   causing a light of the vehicle to blink by a control unit under a certain condition when a power outage is detected;
   specifying a position of the user; and
   determining whether the vehicle is in a field of view of the user according to the specified position, wherein
   the condition includes that the vehicle is in the field of view of the user.

18. The control method according to claim 17, further comprising presenting, by the control unit, the user with guidance regarding use of the power supply function when the blinking of the light is stopped.

\* \* \* \* \*